SPACE HEATER BASE PLATE CONSTRUCTION

Original Filed May 11, 1967

INVENTOR.
HARRY FRANKE

BY
Christensen, Sanborn & Whitham

ATTORNEYS

United States Patent Office

Re. 27,131
Reissued June 1, 1971

27,131

SPACE HEATER BASE PLATE CONSTRUCTION

Harry Franke, Mercer Island, Wash., assignor to Spot Heaters, Inc., Sunnyside, Wash.

Original No. 3,409,001, dated Nov. 5, 1968, Ser. No. 637,672, May 11, 1967. Application for reissue Sept. 29, 1969, Ser. No. 869,972
Int. Cl. A01g *13/06*
U.S. Cl. 126—59.5 9 Claims

Matter enclosed in heavy brackets [ ] appears in the original patent but forms no part of this reissue specification; matter printed in italics indicates the additions made by reissue.

ABSTRACT OF THE DISCLOSURE

A base plate construction for an outdoor space heater which includes a stack defining a chamber for burning a mixture of fuel and air, a base forming the bottom of the chamber and supporting the stack above the supporting surface, and means including a nozzle for delivering a spray of fuel to the heater. The base comprises a circular base plate having a central opening therein adapted to receive the nozzle in a position to spray a mist of fuel upwardly into the chamber, a plurality of arcuate apertures surrounding the nozzle receiving opening in the immediate proximity thereof, and arcuate fins secured to the base plate along the outer peripheries of the arcuate apertures and inclined convergently toward the head of said nozzle to direct air entering through the apertures toward the nozzle head to cool the same and effect mixture of the air with the fuel emanating therefrom.

Background of the invention

This invention relates to space heaters for use outdoors such as in an orchard and more particularly in an improved base plate construction for space heaters of the type having a stack enclosing a chamber for burning a fuel-air mixture, means for spraying a mist of fuel into the chamber, and means providing for entry of air into the chamber to be mixed with the mist for burning. While the invention is described herein in terms of the preferred form of the invention, possible changes and modifications will be recognized by those skilled in the art within the scope of the principles involved.

Orchardists have long sought efficient means for heating orchards during the critical frost season to prevent damage to growing fruit, and many such heaters have been provided on the basis of different approaches and having various configurations. Problems encountered in attempts to construct more efficient orchard heaters have included the difficulty of achieving complete combustion of the fuel within the heater. Indeed, for many years the types of heater in prevalent use were called "smudge pots" because of the excessive amounts of smoke which they produced. In recent years greater efforts have been put forth to reduce the smog created by orchard heating systems for compliance with smog control laws, and burner efficiency has been greatly improved.

One of the most successful types of orchard heater relies upon a relatively large-volume stack and a nozzle which creates a fine mist of oil sprayed upwardly into the chamber and mixed with air entering the chamber through portholes in the bottom and sides. Problems encountered with this type of heater have included overheating of the stack and nozzle which shortens the life of the parts, including the nozzle itself, and the continuing necessity for improving burning efficiency to reduce to as close to zero as possible the number of unburned particles emanating from the top of the stack.

It is the purpose of this invention to provide an improvement in orchard heaters which enhances the burning efficiency thereof by effecting more immediate and thorough mixture of air with the fuel mist emanating from the nozzle.

A related object is to provide means for enhancing air flow around the nozzle to cool it, thereby increasing its useful life in the system.

At the same time the improved airflow in the proximity of the nozzle causes earlier and more complete combustion of the fuel mist emitted from it, and a smaller percentage of unburned fuel mist reaches the walls of the chamber. The invention thus reduces the collection of carbon particles on the inside of the chamber walls and improves the temperature uniformity within and the radiation effectiveness of the heater.

Summary of the invention

Accordingly, the invention provides an improved base plate for an outdoor space heater which includes a stack defining a chamber for burning a mixture of fuel and air, a base plate forming the bottom of the chamber and having legs supporting the stack above the ground for entry of air beneath the base, and a nozzle adapted to spray upwardly into the chamber. The base plate includes means defining a central opening for receiving the nozzle axially therein in a position having its spray-producing head spaced above the base plate, a plurality of apertures surrounding the nozzle-receiving opening in close proximity therewith, and a plurality of air-directing fins attached to the base plate along the outer edges of the apertures and inclined convergently toward the nozzle head to direct upward flow of air toward the nozzle head and toward the fuel spray emanating therefrom for mixture of the air therewith.

Preferably the aperture and fins are arcuate in shape and surround the central opening with equidistant spacing from the nozzle. The base plate is preferably of one-piece construction wherein the arcuate fins are raised from the base plate material itself, forming the arcuate apertures immediately adjacent to the fins and of substantially the same shape and size. The central nozzle-receiving opening is formed from a ring of base plate material concentric with the arcuate apertures, supported by base plate material extending radially between the apertures, and having a downwardly directed flange surrounding the opening to strengthen the ring and locate the nozzle in the opening.

These and other features, objects and advantages of the invention will become more apparent from the following detailed description thereof taken in connection with the accompanying drawings illustrating the preferred embodiment.

Description of the preferred embodiment

An orchard heating system in which the invention may be used typically includes a source of fuel, such as oil or other fuel, a plurality of distribution lines or feeder lines for delivering fuel from the source to heaters distributed throughout the orchard, and means for pumping the fuel under pressure through the lines. These elements are well known to any person skilled in the art. Such a system is disclosed, for example, in U.S. patent of C. A. Fugit, No. 2,016,002 Oct. 1, 1935.

Figure 2:
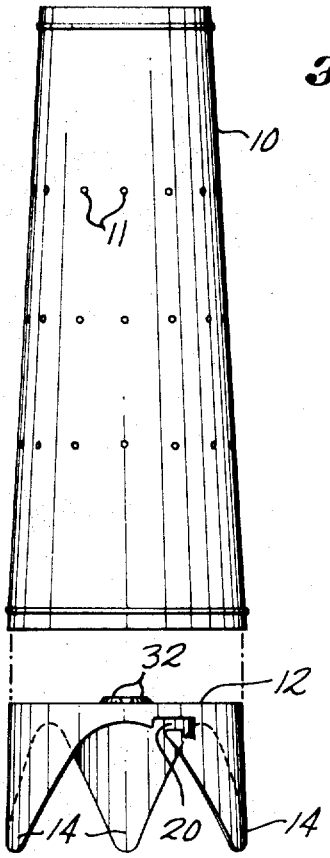
FIGURE 2 is a side view showing the stack and base plate disconnected from each other.
Figure 1:
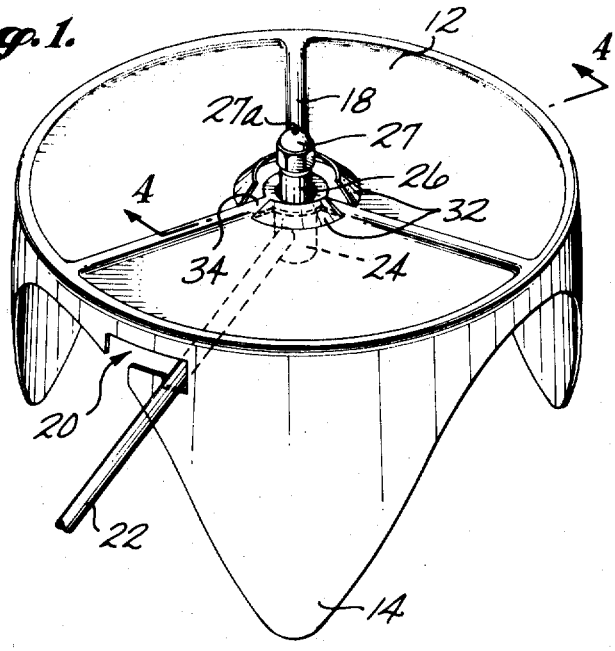
FIGURE 1 is an isometric view of an orchard heater base plate construction in accordance with the invention, showing a fuel mist-creating nozzle positioned therein.
Figure 4:
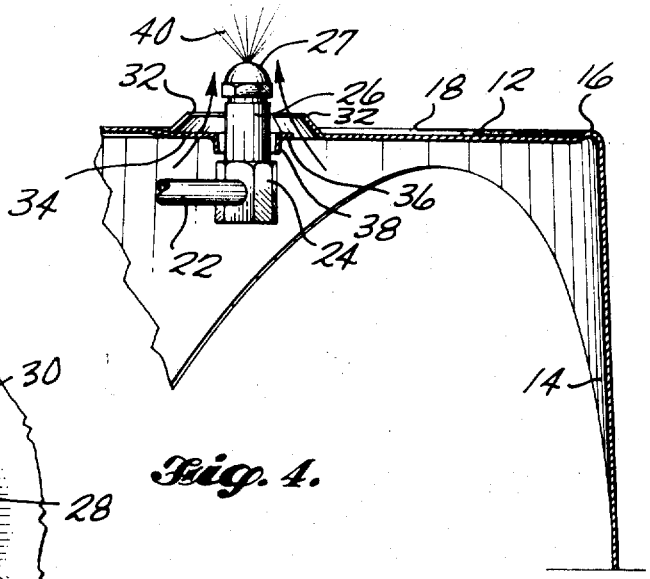
FIGURE 4 is a fragmented, sectional side view of the improved base plate construction, taken along lines 4—4 of FIGURE 1.
Figure 3:
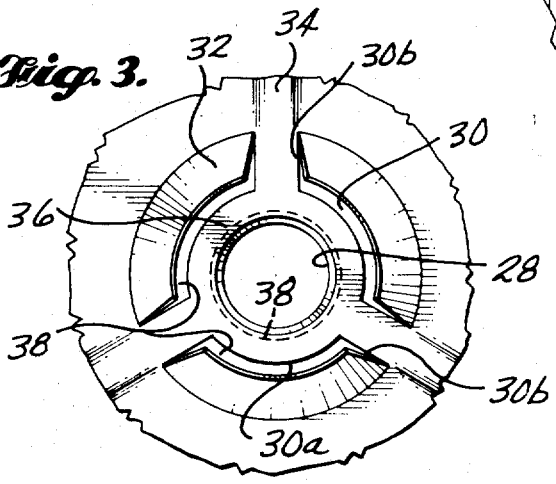
FIGURE 3 is a fragmented top view showing the central portion of the improved base plate in actual size.

The heater shown in the drawings for illustration of the invention includes an open-topped frusto-conical stack 10 defining the combustion chamber, and a base plate 12 supported on three legs 14 above the ground for entry of air beneath. The illustrated stack is ten inches in diameter at the bottom, eight inches in diameter at the top, and about twenty-eight inches high. The aperture sizes and fin configurations shown in FIGURE 3 have been found successful for an oil-fired heater with these stack dimensions in the arrangement shown. The stack and the base are commonly made from galvanized steel or the like.

The base is preferably of one-piece construction, comprising a circular base plate 12 and curved legs 14 all formed from a single substantially triangular piece of flat galvanized steel in a suitable press machine. The arcuate re-entrant spaces between the curbed legs are optional. The one-piece construction of the base as a whole provides advantages in terms of durability and strength and provides for freedom of air movement beneath the heater as well. The circular rim 16 around the periphery of the plate, and the raised radial ribs 18 are also optional features of the design insofar as this invention is concerned.

A bayonet-type notch 20 formed in one leg supports the connector line 22 leading from a fuel distribution line (not shown) and carrying an adapter 24 and nozzle 26. The slot 20 serves to position the nozzle 26 within the central opening 28 of the base plate.

In accordance with the invention the central opening 28 is surrounded by the three arcuate openings 30 concentric therewith and formed by means of a suitable machine adapted to cut the plate along arcuate and radial lines 30a and 30b and raise the arcuate fins 32 from the plate to the positions shown. The fins converge preferably directly toward the nozzle head 27 at an inclination of approximately 45° to direct the upward flow of incoming air toward the nozzle head and the fuel mist 40 emanating from the head.

Extensions of the base plate between the radial lines 30b form supports 34 for the ring 36 defining the nozzle receiving openings 28. The opening 28 itself is formed by punching material downwardly from the base plate, forming an annular flange 38 of base plate metal to help position the nozzle and adapter 14 vertically within the opening 28.

The illustrated nozzle 27 is an oil nozzle which includes internal means (not shown) for causing oil to emanate from a single orifice 27a in a cone-shaped vortex pattern 40 and in the fine droplets which form a mist easily mixed with the air directed across the nozzle head 27 by fins 32. While combustion of the oil occurs in more immediate proximity with the nozzle head because the fins 32 cause more immediate mixture of fresh air therewith, the nozzle head 27 is nevertheless cooled by the incoming air directed by the fins, and hence it operates at a lower temperature. While oil typically used burns at about 390° F., the nozzle temperature is maintained at approximately 140° F. Combustion is more complete, beginning lower within the stack and less unburned oil reaches the walls so that less carbon formation results, increasing the useful life of the stack. The number of unburned fuel particles leaving the top of the stack is reduced substantially.

Orchard heaters including the improved base plate construction have been found considerably more effective than any previously known orchard heaters. For example, at a consumption rate of 1¼ gallons of oil per hour for each heater, with heater spacing equivalent to thirty-five heaters per acre, the system is capable of a heat yield per acre of 6,125,000 B.t.u.'s per hour. With a lesser oil consumption rate of ¾ of a gallon per hour for each heater and the same heater density per acre, the heat yield achieved has been approximately 3,675,000 B.t.u.'s per hour.

What is claimed is:

1. An outdoor space heater comprising a stack defining a chamber for burning a mixture of fuel and air therein, a base plate forming the bottom of said chamber, legs for supporting said base plate and stack above the ground for entry of air beneath the base plate, and a fuel injection nozzle adapted to spray fuel upwardly into said chamber, said base plate including means defining a central opening adapted to receive said nozzle axially therein, a plurality of apertures surrounding said central opening in proximity with said nozzle, and a plurality of fins secured to the base plate along the outside edges of said apertures, respectively, and inclined convergently toward said nozzle to direct air entering through said apertures toward said nozzle and toward the spray emanating therefrom.

2. In an outdoor space heater which includes a chamber for burning a mixture of fuel and air therein, nozzle means adapted to spray fuel upwardly into the chamber, and a base plate forming the bottom of the chamber and supported above the ground for entry of air beneath the base plate, an improved base plate construction comprising central opening means adapted to receive said nozzle means axially therein and including air inlet aperture means substantially surrounding said nozzle means and located in proximity therewith, and air directing fin means secured to the base plate along the outside edges of said aperture means and inclined inwardly to direct air entering through said aperture means to converge toward said nozzle means and toward the fuel spray emanating therefrom.

3. The space heater base plate construction defined in claim 2 wherein said base plate is of one-piece metal construction and said aperture and fin means are formed by having portions of said *base* plate raised upwardly therefrom to form a plurality of fins and apertures arranged substantially concentrically around said central opening, said *base* plate further having an unraised ring-shaped portion concentric with and adjacent to said apertures and defining said central opening, and unraised portions extending radially between said apertures and supporting said ring-shaped portion.

4. The space heater base plate construction defined in claim 3 in combination with a fuel mist creating nozzle having a hollow head and an orifice in the top of said head and operable to produce an upward spray of fuel delivered thereto under pressure, said *base* plate including means for positioning said orifice above the base plate at substantially the point of convergence of said fins.

5. The space heater base plate construction defined in claim 3 wherein said apertures and fins are arcuate in shape.

*6. In an outdoor space heater which includes a chamber for burning a mixture of fuel and air therein, nozzle means adapted to spray fuel into the chamber, and an inlet plate member, an improved construction of said inlet plate member comprising:*

*said inlet plate member extending generally radially of said nozzle means and having an opening therein adapted to receive said nozzle means axially therein, said inlet plate member including axial ambient air inlet aperture means substantially surrounding said nozzle means and located in proximity therewith, and ambient air directing fin means secured to said plate member along the outside edges of said aperture means and inclined inwardly to turn ambient air entering generally axially through said aperture means partially radially inwardly to converge in the axial direction toward said nozzle means and toward the fuel spray emanating therefrom.*

*7. In an outdoor space heater which includes a chamber for burning a mixture of fuel and air therein, nozzle means adapted to spray fuel into the chamber, and an inlet plate member, an improved construction of said inlet plate member comprising:*

*said inlete plate member having a central opening adapted to receive said nozzle means axially therein and including air inlet aperture means substantially surrounding said nozzle means and located in proximity therewith, and air directing fin means secured to said plate member along the outside edges of said aperture means and inclined inwardly to direct air entering through said aperture means to converge toward said nozzle means and toward the fuel spray emanating therefrom,*

*said air aperture means and said fin means being formed by having portions of said plate raised therefrom to form a plurality of fins and apertures arranged substantially concentrically around said central opening, said plate member further having an unraised ring-shaped portion concentric with and adjacent to said apertures and defining said central opening, and unraised portions extending radially between said apertures and supporting said ring-shaped portion.*

*8. The space heater inlet plate member construction defined in claim 7 in combination with a fuel mist creating nozzle having a hollow head and an orifice at the inner end of said head and operable to produce a spray*

*of fuel delivered thereto under pressure, said plate member including means for positioning said orifice inwardly of the plate member at substantially the point of convergence of said fins.*

*9. The space heater inlet plate member construction defined in claim 7 wherein said apertures and fins are arcuate in shape.*

References Cited

The following references, cited by the Examiner, are of record in the patented file of this patent or the original patent.

UNITED STATES PATENTS

| | | | |
|---|---|---|---|
| 1,571,969 | 2/1926 | Rupprecht | 126—59.5 |
| 2,260,548 | 10/1941 | Veghte | 126—59.5X |
| 2,269,831 | 1/1942 | Senner et al. | 126—59.5X |
| 2,628,609 | 2/1953 | Bacon | 126—59.5 |
| 3,030,773 | 4/1962 | Johnson | 431—352X |
| 3,409,000 | 11/1968 | Brader et al. | 126—59.5 |

CHARLES J. MYHRE, Primary Examiner

U.S. Cl. X.R.

431—352